No. 871,178. PATENTED NOV. 19, 1907.
J. OSTRANDER.
SHEET PACKING.
APPLICATION FILED JUNE 21, 1906.

Witnesses
Frank A. Fahle
Thomas H. McMeans

Inventor
James Ostrander
By Bradford A. Hood
Attorneys

UNITED STATES PATENT OFFICE.

JAMES OSTRANDER, OF INDIANAPOLIS, INDIANA.

SHEET-PACKING.

No. 871,178.　　　　Specification of Letters Patent.　　　Patented Nov. 19, 1907.

Application filed June 21, 1906. Serial No. 322,688.

*To all whom it may concern:*

Be it known that I, JAMES OSTRANDER, a citizen of the United States, residing at Indianapolis, in the county of Marion and State of Indiana, have invented certain new and useful Improvements in Sheet-Packing, of which the following is a specification.

The object of my invention is to produce a flexible sheet packing one or both faces of which are provided with projecting portions having a greater resistance to compression than the main body of the sheet, whereby, when the packing is placed between two surfaces and subjected to compression the first compression will occur in the main body of the sheet under or between the inner ends of the less compressible projections. These projections may be isolated if desired, but I prefer to so connect them that no line can be drawn from one edge of the surface of the sheet to an opposite edge without intersecting one or more of the projections and therefore the projections should preferably be in the form of closed touching figures.

The projections need not necessarily be integral with the intermediate body of the sheet, but I prefer a packing made in this way and the accompanying drawings illustrate my invention as embodied in a rubber sheet packing.

Figure 1:
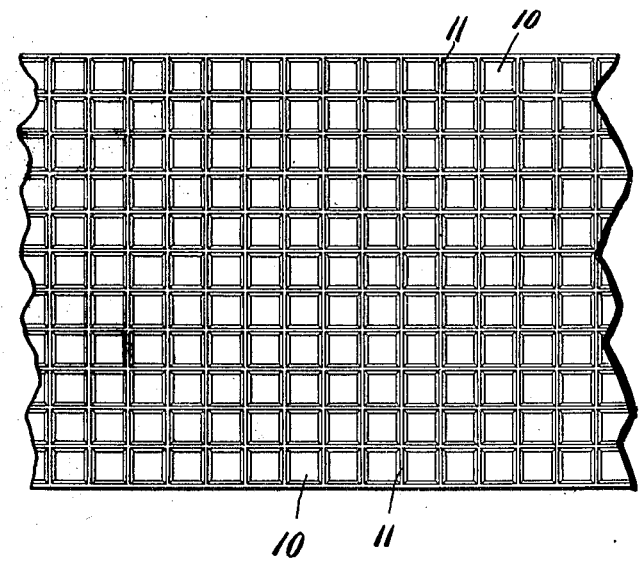
Figure 2:
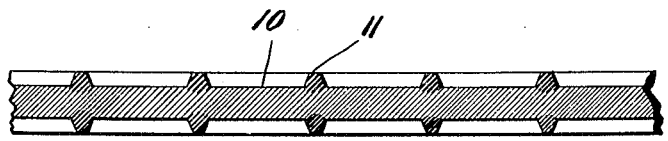
Figure 3:
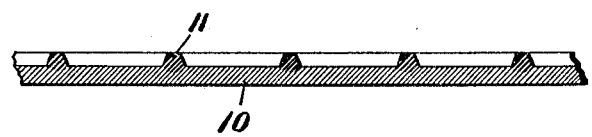

Figure 1 is a plan of my packing with a desirable and conveniently formed arrangement of projections; Fig. 2 a magnified sectional view, and Fig. 3 a sectional view of a form having projections on only one face.

In the drawings 10 indicates the main or intermediate portion of the sheet and 11 indicate the projections preferably oppositely arranged. When the sheet is made of rubber the projections 11 should be vulcanized or otherwise hardened so as to have a greater resistance against compression. If both faces of the packing are provided with the projections they should be arranged exactly opposite each other, and in height should be less than half the thickness of the intermediate portion of the sheet.

In operation the packing will be prepared for reception in the desired place by cutting to the desired size in the usual manner. It will then be placed between the two surfaces to be packed and said surfaces brought together with the desired degree of compression. The first result of compression will be to drive the less compressible ribs or projections into the intermediate sheet thus pinching the intermediate sheet between them while the intermediate sheet will be bulged up toward the approaching surfaces so that when the two surfaces have been brought together so as to contact with the surfaces of the packing there will be lines of contact where the compression is quite considerable while at others the contact of the packing with the surfaces will be at a considerable less pressure. As a consequence a tight joint will be made and the intermediate portion of the sheet is pinched between the less compressible portions and thus prevented from being blown out.

I claim as my invention:

1. A sheet packing comprising an intermediate portion having on each face oppositely arranged projections which are less compressible than the intermediate portion.

2. A sheet packing comprising a main portion having on one face projections which are less compressible than the main portion.

3. In a sheet packing the combination with an intermediate compressible portion, of portions of less compressible material arranged opposite each other on the opposite faces of the intermediate portion.

4. In a sheet packing the combination with a main compressible portion, of portions of less compressible material arranged on one face of the main portion.

5. A sheet packing comprising an intermediate compressible portion and a facing of projecting portions forming adjacent closed figures of less compressible material, the projections on the opposite sides of the intermediate portion being arranged opposite each other.

6. A sheet packing comprising a main compressible portion and a facing of projecting portions forming adjacent closed figures of less compressible material.

7. A sheet packing comprising an intermediate compressible sheet and projections formed integral therewith and on the opposite faces thereof of material less compressible than the intermediate portion.

8. A sheet packing comprising a main compressible sheet and projections formed integral therewith and on one face thereof of material less compressible than the main portion.

9. A packing composed of a sheet of rubber having opposed projections on its opposite faces vulcanized so as to be less compressible than the intermediate portion.

10. A packing composed of a sheet of rubber having projections on one face vulcanized so as to be less compressible than the intermediate portion.

11. A packing composed of a sheet of rubber having on each face projecting portions forming touching closed figures, said projections being arranged opposite each other on the two faces and being vulcanized to be less compressible than the intermediate portion.

12. A packing composed of a sheet of rubber having on one face projecting portions forming touching closed figures, and being vulcanized to be less compressible than the intermediate portion.

In witness whereof, I, have hereunto set my hand and seal at Indianapolis, Indiana, this 16th day of June, A. D. one thousand nine hundred and six.

JAMES OSTRANDER. [L. S.]

Witnesses:
ARTHUR M. HOOD,
THOMAS W. MCMEANS.